(12) United States Patent
Zhang et al.

(10) Patent No.: US 11,990,929 B2
(45) Date of Patent: *May 21, 2024

(54) SYSTEMS AND METHODS OF EXPOSURE CONTROL WITH WIRELESS LINKS

(71) Applicant: Meta Platforms Technologies, LLC, Menlo Park, CA (US)

(72) Inventors: Jie Zhang, Newark, CA (US); Kyungho Kim, San Jose, CA (US); Insoo Hwang, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,928

(22) Filed: Feb. 24, 2023

(65) Prior Publication Data
US 2023/0216532 A1    Jul. 6, 2023

Related U.S. Application Data

(63) Continuation of application No. 17/372,013, filed on Jul. 9, 2021, now Pat. No. 11,595,072.

(51) Int. Cl.
| *H04B 1/3827* | (2015.01) |
| *H01Q 1/24* | (2006.01) |
| *H04B 5/00* | (2006.01) |
| *H04W 28/02* | (2009.01) |
| *H04W 52/26* | (2009.01) |
| *H04W 52/36* | (2009.01) |

(52) U.S. Cl.
CPC .......... *H04B 1/3838* (2013.01); *H01Q 1/245* (2013.01); *H04W 28/0268* (2013.01); *H04W 52/265* (2013.01); *H04W 52/365* (2013.01); *H04W 52/367* (2013.01); *H04B 2001/3866* (2013.01)

(58) Field of Classification Search
CPC .......... H04B 1/3838; H04B 2001/3866; H04B 5/0043; H01Q 1/245; H04W 28/0268; H04W 52/265; H04W 52/365; H04W 52/367

See application file for complete search history.

(56) References Cited

U.S. PATENT DOCUMENTS

| 10,965,335 | B1 | 3/2021 | Jadhav et al. | |
| 11,595,072 | B2 * | 2/2023 | Zhang | H04W 52/365 |
| 2012/0021707 | A1 | 1/2012 | Forrester et al. | |
| 2017/0013539 | A1 | 1/2017 | Lepp et al. | |

(Continued)

*Primary Examiner* — Andrew Wendell
(74) *Attorney, Agent, or Firm* — Foley & Lardner LLP

(57) ABSTRACT

Described embodiments provide systems and methods for adjusting a radio usage of a wireless link according to a time-averaged specific absorption rate (SAR). A first device configured to concurrently maintain a first wireless link with a second device and a second wireless link with an access point of a network may determine a proposed radio usage of the first wireless link and the second wireless link. The first device may determine a state of the first device according to the proposed radio usage and sensor information from at least one sensor of the first device. The first device may determine a time-averaged SAR of a user due to the first device, according to a defined time window and the determined state of the first device, to adjust the proposed radio usage of the first wireless link and the second wireless link to satisfy a threshold level of the time-averaged SAR.

20 Claims, 8 Drawing Sheets

(56) References Cited

U.S. PATENT DOCUMENTS

| | | |
|---|---|---|
| 2017/0265148 A1 | 9/2017 | Balasubramanian et al. |
| 2018/0255117 A1 | 9/2018 | Ljung et al. |
| 2018/0288709 A1 | 10/2018 | Yao et al. |
| 2020/0383068 A1 | 12/2020 | Yang et al. |
| 2021/0408671 A1 | 12/2021 | Kim et al. |
| 2022/0103214 A1 | 3/2022 | Gopal et al. |
| 2022/0194391 A1 | 6/2022 | Ferguson |

* cited by examiner

SYSTEMS AND METHODS OF EXPOSURE CONTROL WITH WIRELESS LINKS

CROSS-REFERENCE TO RELATED APPLICATION

This application claims the benefit of priority under 35 U.S.C. § 120 as a continuation of U.S. non-provisional patent application Ser. No. 17/372,013, filed on Jul. 9, 2021, the disclosure of which is incorporated herein by reference in its entirety.

FIELD OF THE DISCLOSURE

The present application generally relates to systems and methods for adjusting a radio usage, including but not limited to systems and methods for adapting a radio usage of one or more wireless links according to a time-averaged specific absorption rate (SAR).

BACKGROUND

Developments in computing devices and communication devices have prompted growth in wearable technology. Wearable devices may integrate various components in a compact form, such that the wearable devices can be portable yet perform complex processes. For example, a wearable device may be a smart watch that may access content over the network, and may control or communicate with other computing devices, etc. For example, a wearable device may be a head mounted display (HMD) that may present artificial reality (e.g., virtual reality, augmented reality, mixed reality, etc.).

SUMMARY

Various embodiments disclosed herein are related to systems and methods for adapting and/or adjusting radio usage of one or more wireless links (e.g., intralink and/or interlink) of a device according to a time-averaged SAR, e.g., for controlling exposure to radio-frequency (RF) energy/radiation. According to the systems and methods described herein, the amount of RF energy emitted by a device (e.g., a wireless and/or wearable device, such as a head wearables device (HWD) or a user equipment (UE)) can be dynamically adapted and/or controlled (e.g., to limit a user's exposure to the emitted RF energy) by adjusting a proposed radio usage of one or more wireless links maintained by the device. In one example, a scheduler of the first device may determine a proposed radio usage (e.g., a RF emission level, a transmission power, and/or other usages, across one or more radio devices on the first device) according to a quality of the one or more wireless links (e.g., channel quality and/or other channel properties, such as channel bandwidth or signal-to-noise ratio), a quality-of-service (QoS) of the one or more wireless links, a configuration of a traffic buffer of the one or more links (e.g., a size of a buffer and/or an amount of traffic), and/or other information of the one or more wireless links. A SAR/power density (PD) engine of the first device may use the proposed radio usage and/or sensor information (e.g., information from proximity sensors and/or capacitive sensors) to determine a state of the first device (e.g., device state index (DSI)). The state of the first device can specify an operating state of the device, for example, whether an entity (e.g., user's body part) is blocking an antenna of the first device, and/or whether a particular radio is enabled. In some embodiments, a SAR/PD control entity of the first device may use the determined state and/or a time-averaged SAR of a user to adjust the proposed radio usage. For example, the SAR/PD control entity can determine an amount of RF radiation in a defined time window and/or a DSI, to use to adjust the proposed radio usage, and therefore, can ensure certain RF control policies (e.g., a threshold level of the time-averaged SAR) are met and/or satisfied.

In one aspect, the present disclosure is directed to a method for adjusting and/or adapting a radio usage of a wireless link according to a time-averaged SAR. The method can include determining, by a first device (e.g., a wireless device, such as a UE), a proposed radio usage (e.g., transmission power) of a first wireless link (e.g., intralink) and a second wireless link (e.g., interlink). The first device may be configured to concurrently maintain the first wireless link with a second device (e.g., another wireless device) and the second wireless link with an access point of a network (e.g., a router and/or other network devices). The first device may determine a state of the first device according to the proposed radio usage and sensor information (e.g., a proximity of the first device to the user) from at least one sensor of the first device (e.g., a proximity sensor, an accelerometer, an inertial measurement unit (IMS), and/or other sensors). The first device may determine a time-averaged SAR of a user due to the first device, according to a defined time window and the determined state of the first device, to adjust the proposed radio usage of the first wireless link and the second wireless link to satisfy a threshold level of the time-averaged SAR.

In some embodiments, the at least one sensor of the first device may acquire the sensor information. The sensor information may comprise at least one of: a proximity of the first device to the user, whether there is contact between the first device and the user, or a motion of the first device. In certain embodiments, the first device may determine the proposed radio usage according to at least one of: a quality of the first wireless link, a quality of the second wireless link, a quality-of-service (QoS) of the first wireless link, a QoS of the second wireless link, a configuration of a traffic buffer of the first wireless link, a configuration of a traffic buffer of the second wireless link, a power headroom corresponding to the first wireless link, or a power headroom corresponding to the second wireless link. The proposed radio usage may comprise at least one of: a data rate, a radio-frequency emission level, a transmission power, a transmission schedule, a ranking or selection of radio devices, or use of one or more antennas, of the first device for at least the first wireless link or the second wireless link.

In some embodiments, the first device may determine the state of the first device further according to at least one of: traffic information of the first wireless link, or traffic information of the second wireless link. In certain embodiments, the first device may determine a proposed subset of antennas to use, according to the sensor information and/or the proposed radio usage. The first device may determine the state of the first device further according to the proposed subset of antennas to use. In some embodiments, the first device may operate at least one radio device of the first device for the first wireless link according to the adjusted radio usage. The first device may operate at least one radio device of the first device for the second wireless link according to the adjusted radio usage, concurrent with the operating of the at least one radio device for the first wireless link.

Various embodiments disclosed herein are related to a first device for adjusting a radio usage of a wireless link according to a time-averaged SAR. The first device may be configured to concurrently maintain a first wireless link with a second device, and a second wireless link with an access point of a network. In some embodiments, the first device may comprise at least one processor. The at least one processor may be configured to determine a proposed radio usage of the first wireless link and the second wireless link. The at least one processor may be configured to determine a state of the first device according to the proposed radio usage and sensor information from at least one sensor of the first device. The at least one processor may be configured to determine a time-averaged SAR of a user due to the first device, according to a defined time window and the determined state of the first device, to adjust the proposed radio usage of the first wireless link and the second wireless link to satisfy a threshold level of the time-averaged SAR.

In some embodiments, the first device may comprise the at least one sensor. The at least one sensor may be configured to acquire the sensor information, wherein the sensor information comprises at least one of: a proximity of the first device to the user, whether there is contact between the first device and the user, or a motion of the first device. In certain embodiments, the at least one processor may be configured to determine the proposed radio usage according to at least one of: a quality of the first wireless link, a quality of the second wireless link, a QoS of the first wireless link, a QoS of the second wireless link, a configuration of a traffic buffer of the first wireless link, a configuration of a traffic buffer of the second wireless link, a power headroom corresponding to the first wireless link, or a power headroom corresponding to the second wireless link. The proposed radio usage may comprise at least one of: a data rate, a radio-frequency emission level, a transmission power, a transmission schedule, a ranking or selection of radio devices, or use of one or more antennas, of the first device for at least the first wireless link or the second wireless link.

In some embodiments, the at least one processor may be configured to determine the state of the first device further according to at least one of: traffic information of the first wireless link, or traffic information of the second wireless link. In certain embodiments, the at least one processor may be configured to determine a proposed subset of antennas to use, according to the sensor information and the proposed radio usage. The at least one processor may be configured to determine the state of the first device further according to the proposed subset of antennas to use. In some embodiments, the at least one processor may be configured to operate, according to the adjusted radio usage, at least one radio device of the first device for the first wireless link. The at least one processor may be configured to operate, according to the adjusted radio usage, at least one radio device of the first device for the second wireless link, concurrent with the operating of the at least one radio device for the first wireless link.

Various embodiments disclosed herein are related to a non-transitory computer readable medium storing program instructions for adjusting a radio usage of a wireless link according to a time-averaged SAR. The program instructions stored in a non-transitory computer readable medium may cause at least one processor to determine a proposed radio usage of the first wireless link and the second wireless link. The at least one processor may reside in a first device configured to concurrently maintain a first wireless link with a second device and a second wireless link with an access point of a network. The program instructions can cause the at least one processor to determine a state of the first device according to the proposed radio usage and sensor information from at least one sensor of the first device. The program instructions may cause the at least one processor to determine a time-averaged SAR of a user due to the first device, according to a defined time window and the determined state of the first device, to adjust the proposed radio usage of the first wireless link and the second wireless link to satisfy a threshold level of the time-averaged SAR.

In some embodiments, the program instructions can cause the at least one processor to determine the proposed radio usage according to at least one of: a quality of the first wireless link, a quality of the second wireless link, a QoS of the first wireless link, a QoS of the second wireless link, a configuration of a traffic buffer of the first wireless link, a configuration of a traffic buffer of the second wireless link, a power headroom corresponding to the first wireless link, or a power headroom corresponding to the second wireless link.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
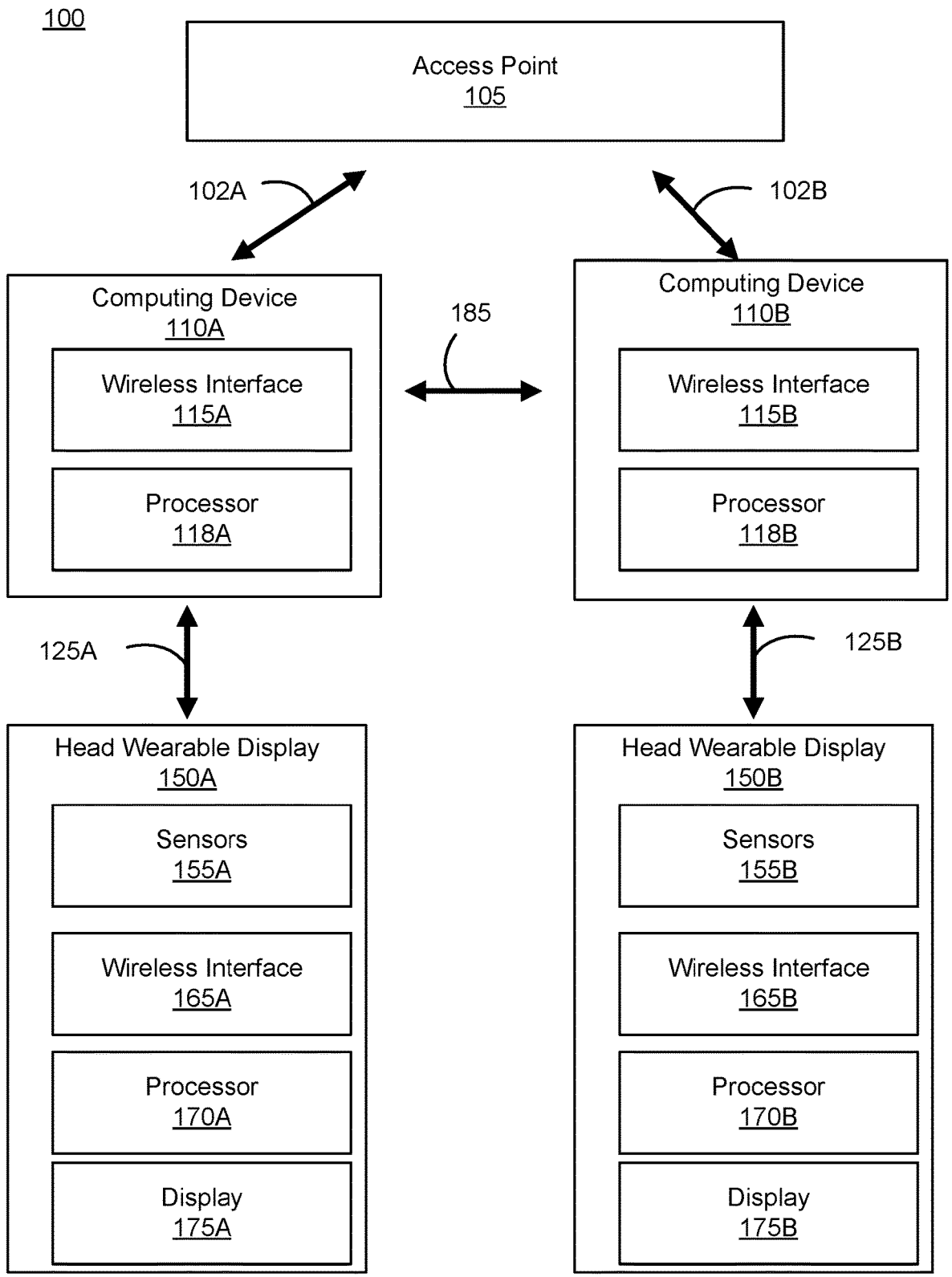
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The systems and methods presented herein include a novel approach for adapting, adjusting, controlling, updating, and/or modifying a proposed radio usage (e.g., a RF emission level, a transmission power, and/or a transmission schedule) of one or more wireless links (e.g., intralinks and/or interlinks) of a device. The novel approach can adapt/adjust/update the proposed radio usage (e.g., determined by a scheduler of the device), of each wireless link for instance, to control and/or limit an amount/level of RF energy (e.g., emitted by the device) exposure (e.g., exposure to a user of the device). In some embodiments, the device (e.g., a wireless device, such as a HWD and/or a UE) may adjust the proposed radio usage based on (or according to) a state of the device (e.g., DSI), sensor information (e.g., information from proximity/motion sensors), a defined/predetermined time window, and/or a time-averaged SAR.

In some embodiments, a first device (e.g., a wearable device and/or a UE) may control, reduce, and/or limit an amount of RF radiation emitted, produced, and/or generated by the first device (or a system that includes the first device) to comply with and/or satisfy one or more RF emission requirements (e.g., a level of a time-averaged SAR and/or power density (PD)), while optimizing RF usage (e.g., intralink and/or interlink operability). For instance, the first device (e.g., UE) may limit an amount of RF emission/radiation to comply with a particular level of a time-averaged SAR (e.g., in W/kg). The time-averaged SAR may indicate and/or specify an average amount of RF exposure (e.g., exposure to a user of a device) over a time period (e.g., a time window). As such, the first device may actively monitor and/or adjust the power output of the first device over time to comply with one or more RF exposure limits (e.g., a threshold level of a time-averaged SAR). In some embodiments, the first device may calculate and/or determine the time-averaged SAR over/in a plurality of separate/distinct time windows, depending on the carrier frequency. For example, if a carrier frequency is less than 3 GHz, the first device may calculate a time-averaged SAR (e.g., an average amount of RF exposure/radiation/energy) over a time window of 100 seconds (or other time instances). In another example, the first device may calculate a time-averaged SAR over a time window of 4 seconds (or other time instances), if a carrier frequency is within 24-42 GHz. As such, the first device may calculate a corresponding time-averaged SAR (e.g., a separate/distinct time-averaged SAR) per carrier frequency.

In certain scenarios, the first device may be configured to have and/or maintain a first wireless link (e.g., intralink) with a second device (e.g., wireless device, such as a UE), for example, as well as a second wireless link with an access point of a network (e.g., interlink), e.g., concurrently for at least a portion of time. The second wireless link may include or correspond to a cellular connection (e.g., long term evolution (LTE), next generation (NG), and/or 5G) and/or a WiFi connection to an external carrier network (e.g., via the access point). The first wireless link, for instance, may be a WiFi/60 GHz connection (and/or other connections) to one or more devices (e.g., a second device and/or other devices) that are located nearby. In some embodiments, radio usage of both the first and second wireless links (e.g., to reduce latency of transmissions) can increase the amount of RF radiation/energy emitted, generated, and/or produced by the first device (and/or a system that includes the first device). Moreover, simultaneous usage of certain technologies (such as technologies that use sub-6 GHz and mm wave bands) may increase RF emissions, as well as performing high order carrier aggregation to improve/increase throughput (e.g., receive (Rx)/transmit (Tx) throughput). As such, the present disclosure presents a novel approach for controlling the exposure (e.g., exposure to a user of the first device) to RF radiation emitted by a first device, without affecting (e.g., deteriorating) the performance of the device.

In some embodiments, the first device may include a SAR/PD engine, an application processor (AP) and/or a SAR/PD control entity (e.g., a SAR/PD controller). A scheduler of the AP may determine and/or generate a preferred/proposed radio usage of at least one wireless link (e.g., a first wireless link and/or a second wireless link) based on a quality of the at least one wireless link, a QoS of the at least one wireless link, and/or a traffic buffer configuration of the at least one wireless link (e.g., a size of a buffer, an amount of traffic, and/or traffic buffer information). The first device may determine the QoS of a wireless link according to (or based on) one or more parameters that indicate, quantify, and/or measure an aspect of a system's performance (e.g., a system that includes the wireless link(s)). The one or more parameters of the QoS may comprise a bit rate, a delay, a packet loss rate, and/or other parameters that measure/quantify the performance of the system. In one example, the scheduler may determine a preferred, predicted, and/or proposed radio usage (e.g., a maximum throughput per wireless link according to the quality and/or QoS of each wireless link) to maintain RF emissions (e.g., by the first device) within RF regulations, while ensuring a certain quality (e.g., channel quality) and/or QoS for each wireless (e.g., radio) link. The proposed radio usage of the wireless link(s) may include or correspond to a ranking or list of a plurality of radios (e.g., a separate ranking/list for each wireless link). The order and/or sequence of the listed radios (e.g., listed radio devices within the raking/list of radios) may indicate and/or specify a preferred/proposed radio usage. For instance, radios that are listed/ranked first/higher within the list/ranking may be more preferable (e.g., for radio usage) than the radios listed last. In some embodiments, the scheduler may provide the proposed radio usage and/or other information (e.g., traffic and/or sensor information) to the SAR/PD engine. The SAR/PD engine may use the proposed radio usage (and/or other information) to determine a state of a device (e.g., a state of the first device).

The SAR/PD engine may receive and/or obtain the proposed radio usage (e.g., the ranking of the radios), the traffic information (e.g., user traffic and/or traffic information of at least one wireless link), the sensor information (e.g., information from proximity and/or motion sensors), and/or other information from the scheduler and/or at least one sensor (or other components of the first device). The traffic information can include or correspond to the amount of traffic on the second wireless link (e.g., interlink, such as a LTE/5G/WiFi connection) and/or first wireless link (e.g., intralink, such as a WiFi/60 GHz connection). The SAR/PD engine may use the information from the scheduler (e.g., proposed radio usage and/or traffic information) and/or the sensor information to determine the state of the device (e.g., state of the first device, as indicated by a device state index (DSI)). The state of the device may indicate, provide, and/or specify an operating state (e.g., operating condition, characteristic, mode, configuration) of the device. For example, the state of the device may indicate whether an entity is blocking an antenna of the device, or whether a particular radio is enabled, malfunctioning or operational.

In some embodiments, one or more proximity sensors (e.g., infrared (IR) based proximity sensors), motion sensors (e.g., accelerometer, gyroscope, and/or IMS) and/or capacitive sensors can obtain and/or provide the sensor information. In one example, the SAR/PD engine may use information from at least one sensor to determine the state of the device. For instance, the device may use information from at least one proximity sensor to determine that the device is in proximity to a certain body part (e.g., the head) of the user of the device. In addition, the SAR/PD engine can determine a preferred antenna subset (e.g., for a scenario with simultaneous/concurrent radio usage) according to the information from the scheduler and/or the sensor information. In some embodiments, the scheduler may allocate and/or schedule the radios (e.g., different radio devices using different communication protocols) based on the state of the device, the QoS of at least one wireless link, and/or the RF exposure budget. For instance, the SAR/PD engine may determine that a DSI (or other device state indicators) of the first device corresponds to a value 1 (or other values). Responsive to determining the value of the DSI, the scheduler of the first device may determine (e.g., according to a table) that the value of a maximum transmit power (corresponding to the determined DSI value) is 22 mW (or other level/quantity). As such, the scheduler may allocate and/or schedule the radios according to a maximum transmit power of 22 mW and/or the QoS of at least one wireless link (e.g., allocating/scheduling without exceeding the determined maximum transmit power).

In some embodiments, the SAR/PD control entity (e.g., SAR/PD controller) may determine a time duration (e.g., a time defined time window) to calculate a time-averaged SAR, and thereby control the RF emissions of the device (e.g., the first device). Responsive to determining the time duration, the SAR/PD control entity may determine and/or monitor a time-averaged SAR of a user due to the device. For instance, the SAR/PD control entity may calculate, compute, and/or determine an amount of RF radiation (e.g., emitted by the device) in a defined time window (e.g., time-averaged SAR), to adjust the proposed radio usage and ensure certain RF control policies (e.g., a threshold level of the time-averaged SAR) are met. In one example, the first device may determine, track, and/or monitor a time-averaged SAR to control/reduce RF exposure, for example by limiting the amount of power emitter by a device and/or changing an antenna/module. The SAR/PD control entity (e.g., to determine the time-averaged SAR), SAR/PD engine (e.g., to determine/communicate the device state, the allocation resources, the antenna subset, and/or other information), and/or scheduler (e.g., to determine a proposed radio usage) can communicate/interact with each other to ensure that the emitted RF radiation (e.g., the time-averaged SAR of a user due to the device) complies with predetermined RF exposure limits (e.g., a threshold level of the time-averaged SAR). Based on communicated information (e.g., provided by the SAR/PD engine and/or the scheduler), the SAR/PD control entity may control and/or limit the RF radiation of at least one wireless link (e.g., according to look-up tables and/or Tx antenna/module/beam selection).

In view of the above discussion regarding adapting and/or adjusting a radio usage of a wireless link (e.g., intralink and/or interlink) according to a time-averaged SAR, a process and/or system for performing said adaptation may be beneficial, as further explained in the following passages. FIG. 1 is a block diagram of an example artificial reality system environment 100, in which a proposed radio usage of a first wireless link (between a first device 110A, 110B (e.g., UE) and a second device 150A, 150B (e.g., HWD)) and/or a second wireless link (between a first device 110A, 11B (e.g., UE) and an access point 105) can be adjusted to satisfy a threshold level of a time-averaged SAR (or other parameters of a SAR). In some embodiments, the artificial reality system environment 100 includes an access point (AP) 105, one or more HWDs 150 (e.g., HWD 150A, 150B), and one or more devices (e.g., computing devices) 110 (computing devices 110A, 110B; sometimes referred to as puck devices or consoles) providing data for artificial reality to the one or more HWDs 150. In some embodiments, the device(s) 110 and/or the HWD(s) 150 can use a determined time-averaged SAR of a user to adjust a proposed radio usage of a first wireless link 125A, 125B and/or a second wireless link 102A, 102B.

The device(s) 110 and the HWD(s) 150 may communicate with each other through a communication link, such as the first wireless link(s) 125A, 125B. The device(s) 110 and the access point 105 may communicate with each other through a communication link, such as the second wireless link(s) 102A, 102B. Through the second wireless links 102A, 102B, the device(s) 110 and/or HWD(s) 150 may access and/or use content (e.g., text, image, audio, video, etc.) from other devices. The first/second wireless link(s) may include or correspond to a cellular link, Wi-Fi link, Bluetooth link, 60 GHz link, ultra wideband link, and/or other types of wireless links. The wireless links 102A, 102B, 125A, 125B may each have an associated QoS, quality (e.g., channel quality), traffic buffer, and/or power headroom. The QoS may indicate a target performance of a wireless link (e.g., first wireless link(s) 125 and/or second wireless link(s) 102). The wireless links 102A, 102B, 125A, 125B may be based on the same protocol or different protocols. For example, the second wireless link(s) 102A, 102B (e.g., interlink) may conform to the 3G, 4G, 5G, NG, LTE, 60 GHz protocol, where the first wireless link(s) may conform to the Wi-Fi link, Bluetooth, and/or other protocols.

In one aspect, the device(s) 110 and/or HWD(s) 150 may dynamically adjust and/or control the proposed radio usage of the first wireless link(s) 125 and/or the second wireless link(s) 102 based on a time-averaged SAR (e.g., to satisfy a threshold level of the time-averaged SAR). The device(s) 110 and/or HWD(s) 150 may detect and/or determine a state of a device (e.g., a proximity of a user to the device(s) 110 and/or HWD(s) 150) according to the proposed radio usage and/or sensor information from at least one sensor 155 (e.g., a proximity sensor). The device(s) 110 and/or HWD(s) 150 may determine a time-averaged SAR for a defined time window according to (or based on) the defined time window and/or the determined state of the device. For example, the device(s) 110 and/or HWD(s) 150 may detect/determine whether the device(s) 110 and/or HWD(s) 150 are worn or held by the user. In some embodiments, the device(s) 110 and/or HWD(s) 150 may perform a comparison of the amount of radiation exposure (e.g., to a user) for a defined time window (e.g., time-averaged SAR) against a time averaged threshold amount of radiation exposure (e.g., a threshold level of the time-averaged SAR), and can allocate radio resources according to the comparison (e.g., adjust a proposed radio usage of the wireless link(s) 102, 125).

In one aspect, a proposed radio usage (e.g., transmission power level, a data rate, a radio-frequency emission level) for the various radios (e.g., radio devices/interfaces) can be determined and/or adjusted, according to the QoS of the wireless link(s) 102, 125, the quality of the wireless link(s) 102, 125, and/or the time averaged SAR. For example, a high power transmission for a brief moment within a time period may be allowed to support the QoS, while ensuring that the determined time-averaged SAR during the time period is below a time-averaged threshold amount of radiation exposure (e.g., threshold level of the time-averaged SAR). Hence, the wireless link(s) 102, 125 may be established or maintained in a reliable manner for a particular content or a process.

In accordance with system environment 100, the access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. In some embodiments, the computing device 110 can be a remote device, a wearable device, a handhold pot device, and/or other types of devices. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location, motion, and/or orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction. In some embodiments, the device(s) 110 and/or the HWD(s) 150 may determine a state of the device (e.g., a state of the computing device(s) 110 and/or a state of the HWD(s) 150) according to sensor information from at least one sensor 155.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

Figure 2:
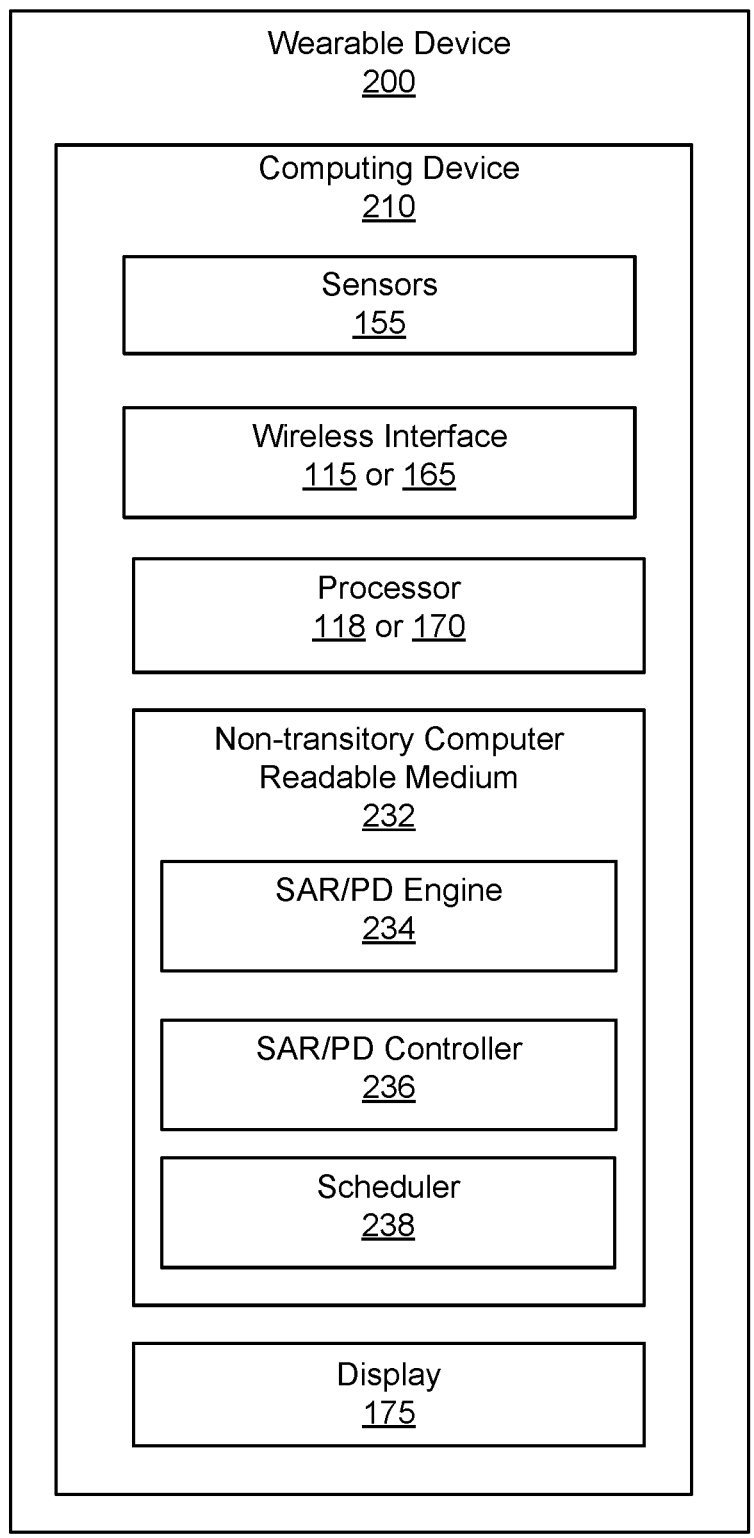
FIG. 2 is a diagram of a wearable device, according to an example implementation of the present disclosure.

FIG. 2 is a diagram of a wearable device 200, according to an example implementation of the present disclosure. In some embodiments, the wearable device 200 may be the device(s) 110 and/or the HWD(s) 150. In some embodiments, the wearable device 200 may include sensors 155, wireless interface 115 or 165, processor 118 or 170, non-transitory computer readable medium 232, and a display 175. These components may operate together to communicate with another device, and generate or render content (e.g., AR content). In certain embodiments, the wearable device 200 can include more, fewer, or different components than shown in FIG. 2.

In some embodiments, the sensors 155 can include electronic components or a combination of electronic components and software components that detect a proximity of a user wearing the wearable device 200, and/or whether there is contact between the wearable device 200 and the user. For example, the sensors 155 can include a hall sensor that can detect whether the user is proximate (e.g., less than 10 mm) to at least one sensor 155, and/or whether the user is contacting the wearable device 200. The sensors 155 may detect a proximity of the user with respect to the wearable device 200, and/or generate sensor information (e.g., sensor measurement data) indicating the detected proximity.

In some embodiments, the processor 118 or 170 may include an electronic component or a combination of an electronic component that can execute instructions stored by the non-transitory computer readable medium 232. The non-transitory computer readable medium 232 may store instructions for executing one or more applications executable by the processor 118 or 170.

Example applications when executed by the processor 118 or 170 may cause the processor 118 or 170 to control and/or adjust the wireless interface 115 or 165. Example applications include a SAR/PD engine 234, a scheduler 238, and/or a SAR/PD control entity, such as a SAR/PD controller 236. These applications may be executed by the processor 118 or 170 to adaptively and/or dynamically control/manage the wireless interface(s) 115 or 165 to adjust a proposed radio use of the wireless link(s), according to a determined time-averaged SAR. In one approach, the SAR/PD controller 236 may determine a time-averaged SAR of a user due to a device, according to a defined time window and/or a state of the device (e.g., determined by the SAR/PD engine 234). The SAR/PD controller 236 may adjust the proposed radio usage (e.g., allocate radio resources) to satisfy a threshold level of the time-averaged SAR, and/or to configure/operate the wireless interface(s) 115 or 165 according to the adjusted proposed radio usage.

In one approach, the processor 118 or 170 executing the scheduler 238 may determine a QoS and/or quality for the wireless interface(s) 115 or 165 or their wireless links/channels. The QoS may indicate a target performance of a wireless link (e.g., first/second wireless link(s) 102, 125) established and/or maintained by the wireless interface 115 or 165. For example, the QoS of a wireless link (e.g., channel, connection, session) may specify a throughput, transit delay, priority, and/or protection of the wireless link. The processor 118 or 170 executing the SAR/PD engine 234 may determine the QoS based on a type of content (e.g., voice over IP, artificial reality (e.g., augmented reality, virtual reality, mixed reality)) to be transmitted. The processor 118 or 170 executing the SAR/PD engine 234 may determine the QoS based on a process to be performed (e.g., hand over, cell search, etc.). The processor 118 or 170 executing the SAR/PD engine 234 may determine the QoS based on a frequency band and/or a protocol for transmission, or other network condition (e.g., traffic or congestion).

In one approach, the processor 118 or 170 executing the SAR/PD controller 236 may determine and/or calculate an amount of radiation exposure (e.g., RF radiation exposure) of the user for a defined time window. In some embodiments, the processor 118 or 170 executing the SAR/PD controller 236 may determine the amount of radiation exposure (e.g., time-averaged SAR) according to a determined state of the device and/or sensor information, such as the detected proximity of the user. In one example, the predicted amount of radiation exposure may be inversely proportional to the detected proximity of the user. For instance, in response to determining that the wearable device 200 is in contact with the user, the processor 118 or 170 executing the SAR/PD controller 236 may adjust a proposed radio usage (e.g., determined by the scheduler 238) to reduce/decrease an average output power level of the wireless interface(s) 115 or 165. In another example, responsive to determining that the wearable device 200 is not in contact with the user, the processor 118 or 170 executing the SAR/PD controller 236 may adjust/modify a proposed radio usage to increase an average output power level of the wireless n interface(s) 115 or 165.

In one approach, the processor 118 or 170 executing the scheduler 238 may determine a proposed radio usage, according to a QoS, quality, traffic buffer, and/or power headroom of at least one wireless link (e.g., first wireless link 125 and/or second wireless link 102). The power headroom of a wireless link (e.g., for different frequency bands of the wireless communication link) can indicate and/or specify a remaining/available power level of a power source of the wearable device 200. For example, the processor 118 or 170 executing the scheduler 238 may determine a proposed radio usage according to a power headroom and/or the QoS of one or more frequency bands. The SAR/PD controller 236 may determine a time-averaged SAR, and/or adjust the proposed radio usage of the one or more frequency bands according to the time-averaged SAR.

In one approach, the processor 118 or 170 executing the SAR/PD engine 234 may determine and/or identify a state of the device(s) 110, 150 (e.g. state of operation of the devices (s)) according to the proposed radio usage and/or sensor information (e.g., information from proximity sensors). The processor 118 or 170 executing the SAR/PD controller 236 can receive the determined state from the SAR/PD engine 234, and/or apply one or more policies corresponding to the determined state (e.g., to satisfy a threshold level of the time-averaged SAR). For example, a policy may indicate or specify a radio control, output power level over time, resource sharing, power/data throttling, traffic shaping, etc., for a wireless interface 115 or 165. The processor 118 or 170 executing the SAR/PD controller 236 may determine and/or identify one or more policies corresponding to the determined device state.

In some embodiments, the processor 118 or 170 executing the SAR/PD controller 236 may allow the wireless interface 115 or 165 to transmit at a high power level (e.g., over 5 dBm) for a brief moment (e.g., 100 ms) within a defined time window (e.g., 60 seconds) to support the (adjusted) proposed radio usage, while ensuring that the time-averaged SAR during the defined time window (e.g., 60 seconds) is below a threshold level of the time-averaged SAR. For example, the processor 118 or 170 executing the SAR/PD controller 236 may increase a portion of radio resources of a first wireless interface 115 or 165 (e.g., cellular network such as 3G, 4G, 5G, etc.) to support a proposed radio usage of the first wireless interface 115 or 165, while decreasing a portion of radio resources of a second wireless interface 115 or 165 (e.g., Bluetooth). The processor 118 or 170 executing the SAR/PD controller 236 may apply different or same defined time windows for different frequency bands or different wireless interfaces 115 or 165 to determine the time-averaged SAR. For example, the time-averaged SAR may be determined for 100 seconds for a frequency band below 3 GHz, 60 seconds for a frequency band between 3 GHz and 6 GHz, and 4 seconds for a frequency band between 24 and 42 GHz. The processor 118 or 170 executing the SAR/PD controller 236 may adjust a proposed radio usage (e.g., of a plurality of wireless interfaces) in a manner that the time-averaged SAR can be below the time averaged threshold, and/or the QoS/quality (of one of more of the associated wireless links) can be supported/met/satisfied for the defined time window.

Figure 3:
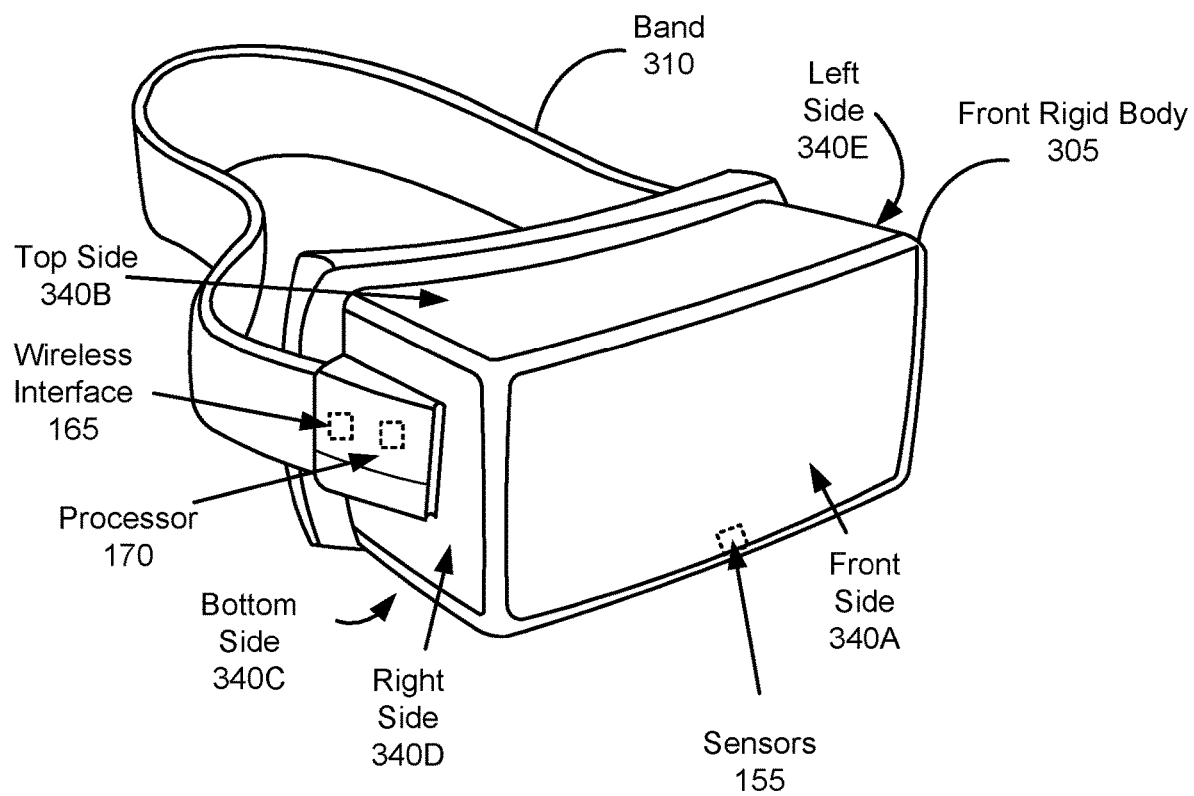
FIG. 3 is a diagram of a head wearable display, according to an example implementation of the present disclosure.

FIG. 3 is a diagram of a HWD 150, in accordance with an example embodiment. In some embodiments, the HWD 150 includes a front rigid body 305 and a band 310. The front rigid body 305 includes the display 175 (not shown in FIG. 3), the lens (not shown in FIG. 3), the sensors 155, the wireless interface 165, and the processor 170. In the embodiment shown by FIG. 3, the wireless interface 165, the processor 170, and the sensors 155 are located within the front rigid body 305, and may not visible to the user. In other embodiments, the HWD 150 has a different configuration than shown in FIG. 3. For example, the wireless interface 165, the processor 170, and/or the sensors 155 may be in different locations than shown in FIG. 3.

Figure 4:
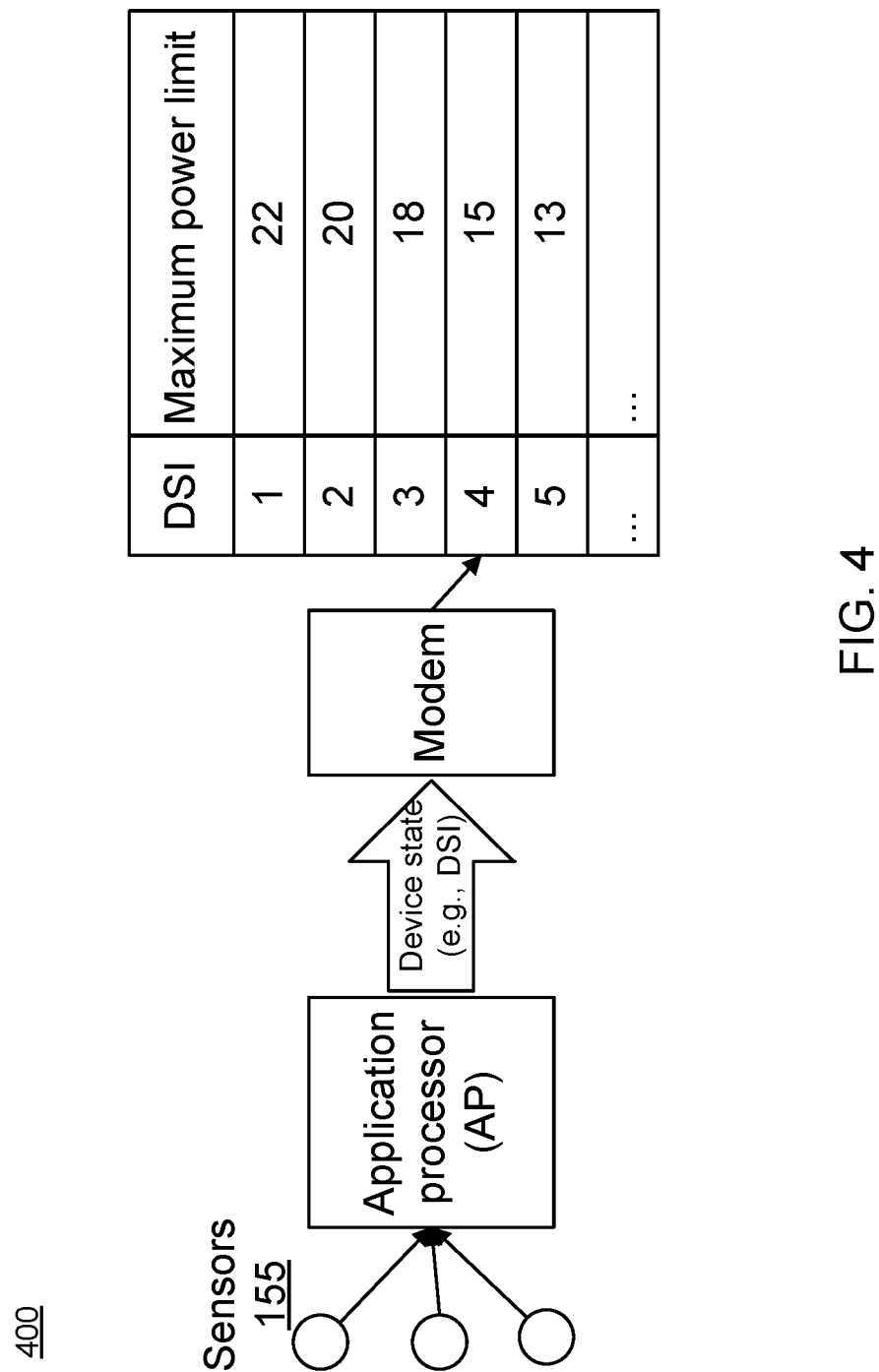
FIG. 4 is a block diagram of a system for controlling a SAR and/or a PD, according to an example implementation of the present disclosure.

Referring to FIG. 4, depicted is a block diagram of one example embodiment of a system 400 that can control and/or adjust a SAR and/or PD. The system 400 may include one or more sensors 155, one or more processors (e.g., an application processor (AP)), and/or a modem. The processor may obtain, acquire, and/or receive sensor information from one or more sensors 155. According to the obtained sensor information, the processor (e.g., AP) may determine and/or identify a state of a device (e.g., DSI and/or other indicators). The modem can receive and/or obtain the determined state of the device. As such, the modem may apply, configure, and/or use an appropriate maximum power limit according to the determined device state (e.g., DSI). A table (e.g., a lookup table) may indicate and/or specify the association/relationship between the state of the device and/or the maximum power limit.

Figure 5:
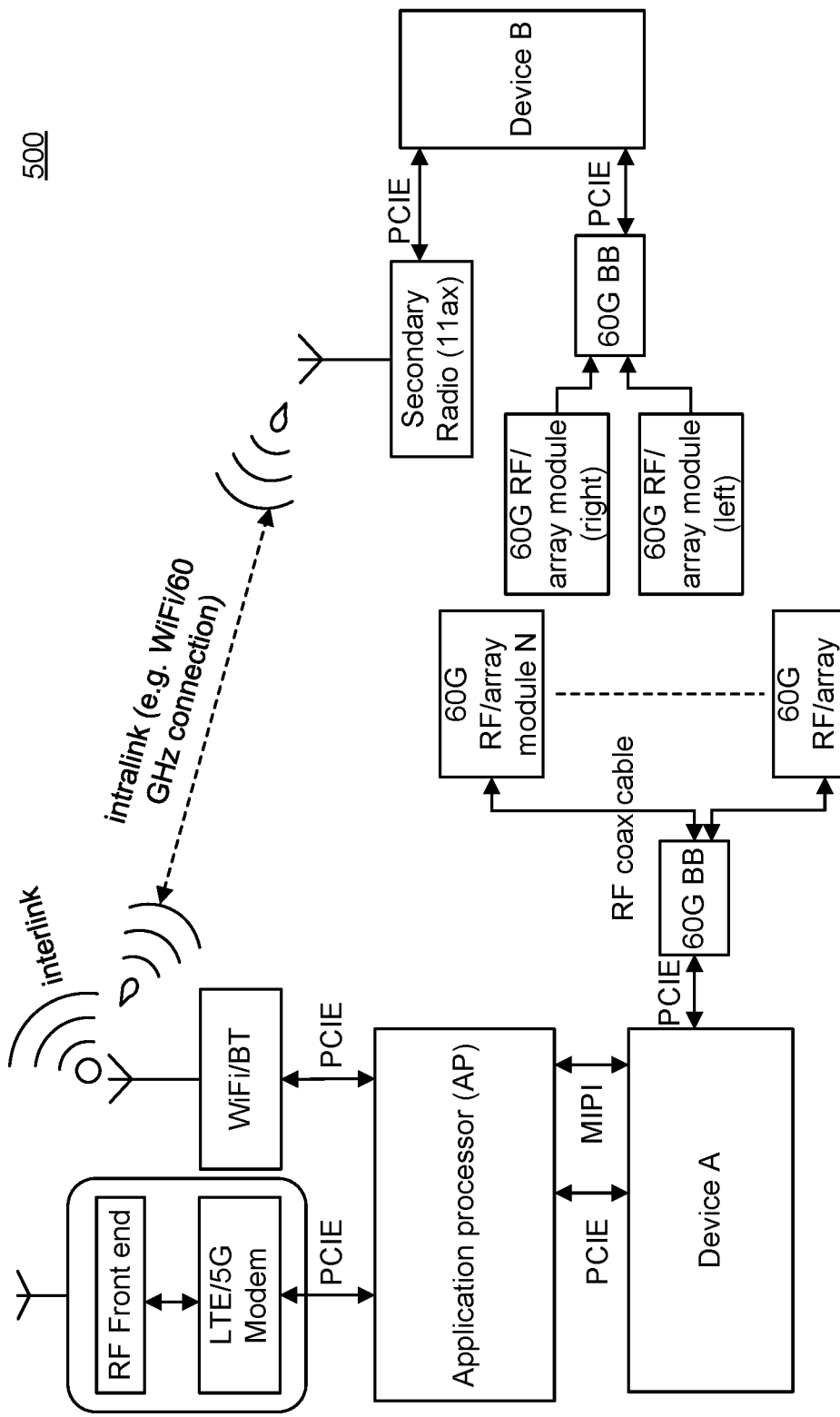
FIG. 5 is a block diagram of a device having one or more wireless links, according to an example implementation of the present disclosure.

Referring to FIG. 5, depicted is a block diagram of one example embodiment of a device 500 (e.g., a HWD 150) that may have a wireless link with a second device (e.g., a UE) and/or with an access point 105 of a network (e.g., intralink and/or interlink). The system 500 may include at least one first wireless link 125 (e.g., intralink) and/or second wireless link 102 (e.g., interlink). The first wireless link 125 may be a WiFi/60 GHz connection to one or more nearby devices. The second wireless link 102 may include or correspond to a cellular (e.g., LTE and/or 5G) and/or WiFi connection to an external network (e.g., an external carrier network). In some embodiments, using both the first and second wireless links (e.g., to reduce the latency of transmissions) may cause an increase in an amount of RF energy/radiation emitted and/or generated by the device 500. Furthermore, simultaneous use of sub-6 and mm wave bands, as well as using high order carrier aggregation (e.g., to improve the throughput of transmissions), may cause/trigger an increase in RF emissions (e.g., from the device 500).

Figure 6:
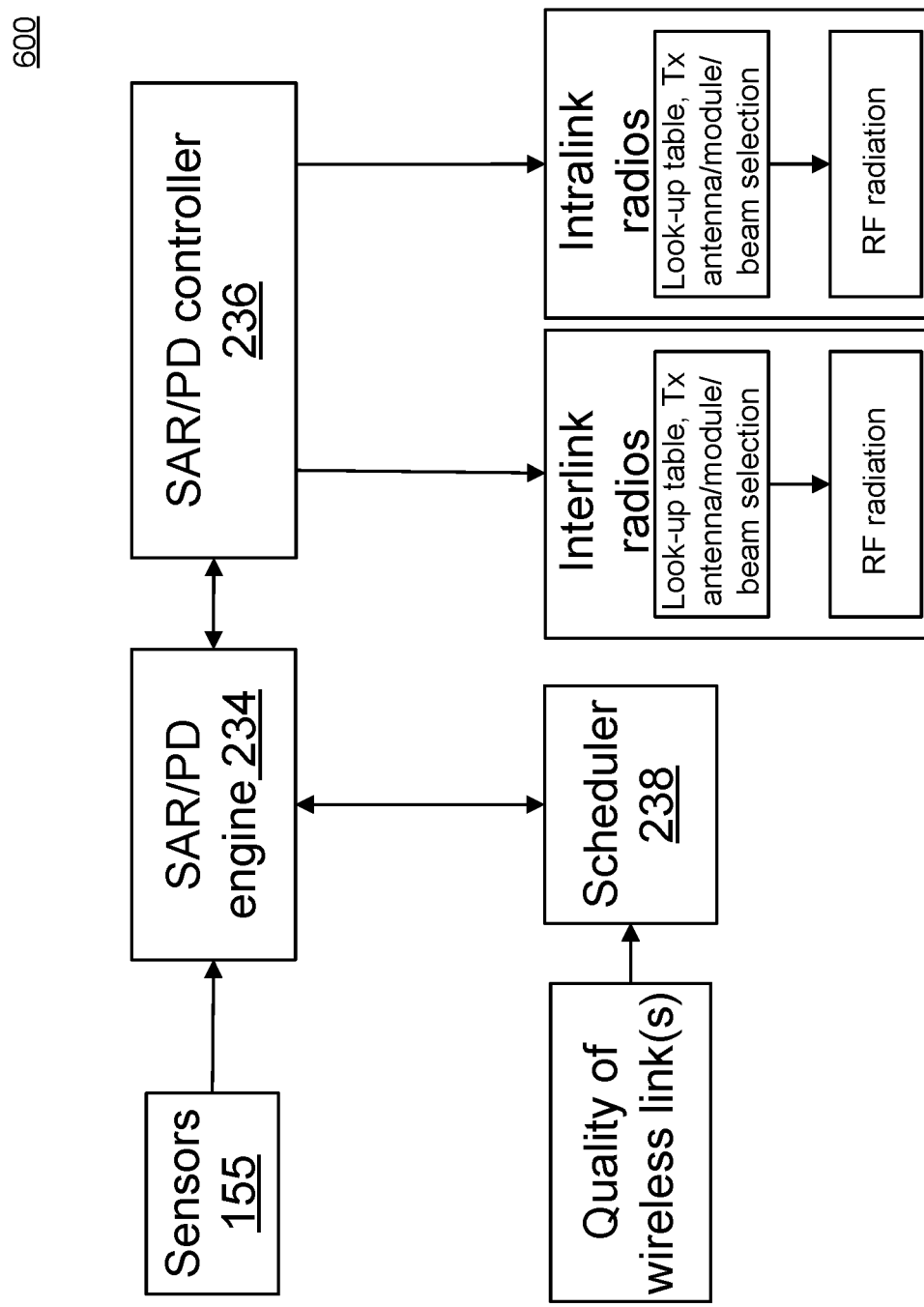
FIG. 6 is a block diagram of a system for adjusting a radio usage of one or more wireless links based on a time-averaged SAR, according to an example implementation of the present disclosure.

Referring to FIG. 6, depicted is a block diagram of one example embodiment of a system 600 for adjusting, modifying, and/or updating a radio usage of one or more wireless links based on a time-averaged SAR of a user, according to an example implementation of the present disclosure. The system 600 may include a scheduler 238, one or more sensors 155, a SAR/PD engine 234, and/or a SAR/PD controller 236. In some embodiments, the scheduler 238 may receive, obtain, and/or acquire a quality (e.g., a channel/link quality) of at least one wireless link, such as a first wireless link 125 and/or a second wireless link 102. The scheduler 238 can receive information of a traffic buffer, such as a configuration of a traffic buffer of at least one wireless link. According to the received quality of at least one wireless link, the scheduler 238 may determine a maximum throughput (and/or other radio usages) for each wireless link. As such, the scheduler 238 may determine and/or generate a proposed/preferred radio usage of each wireless link over a time period. The scheduler 238 may schedule and/or prioritize one or more transmissions according to the proposed radio usage(s) (e.g., according to a QoS) and/or other information. For instance, the scheduler 238 may use a determined a power margin (e.g., minimum power to meet specified performance, such as QoS) for each wireless link (e.g., power margin(s) determined by SAR/PD engine 234) to allocate one or more transmissions.

In some embodiments, the SAR/PD engine 234 may receive and/or obtain sensor information from one or more sensors 155 of a device (e.g., a computing device 110 and/or a HWD 150). The SAR/PD engine 234 may receive information from the scheduler 238, such as the proposed radio usage determined by the scheduler 238 and/or an amount of traffic of one or more wireless links (e.g., a first wireless link 125 and/or a second wireless link 102). In certain embodiments, the SAR/PD engine 234 may allocate one or more SAR resources, according to the information provided by the scheduler 238. In a scenario with concurrent radios, the SAR/PD engine 234 may select and/or determine a proposed subset of antennas to use. The SAR/PD engine 234 may determine and/or identify a state of a device according to the sensor information and/or the proposed radio usage. The SAR/PD engine 234 may provide, specify, and/or indicate the state of the device to the SAR/PD controller 236. In some embodiments, the SAR/PD engine 234 may store and/or maintain an antenna index and/or an associated wireless link (e.g., in a scenario with concurrent radios). The SAR/PD engine 234 may update a table with a preferred/proposed antenna grouping per QoS of a wireless link. In some embodiments, the SAR/PD engine 234 may use beam identification (ID), horizontal/vertical (H/V) polarization, and/or module switching to update the table. The SAR/PD engine 234 can maintain an aggregated exposure table for each wireless link associated with a particular antenna, beam, polarization, module, and/or beam.

In some embodiments, the SAR/PD controller 236 may determine, compute, and/or configure a defined time window for performing and/or determining a time-averaged SAR of a user. The SAR/PD controller 236 may determine an amount of RF energy emitted by the device (e.g., RF exposure to a user) within the defined time window. Therefore, the SAR/PD controller 236 may determine a time-averaged SAR according to the defined time window and/or other information. In some embodiments, the SAR/PD controller 236 may apply a policy (e.g., limit transmission power and/or change an antenna/module) to satisfy a threshold level of the time-averaged SAR (or other SAR parameters, such as an accumulated SAR). For example, the SAR/PD controller 236 may use a look-up table to adjust and/or modify a radio usage of one or more wireless links (e.g., to control an amount of RF radiation), such as a first wireless link 125 (e.g., intralink radios) and/or a second wireless link 102 (e.g., interlink radios). In one example, the SAR/PD controller 236 may select, change, and/or modify one or more Tx antennas, modules, and/or beams to modify a radio usage of one or more wireless links (e.g., interlink radios and/or intralink radios).

Figure 7:
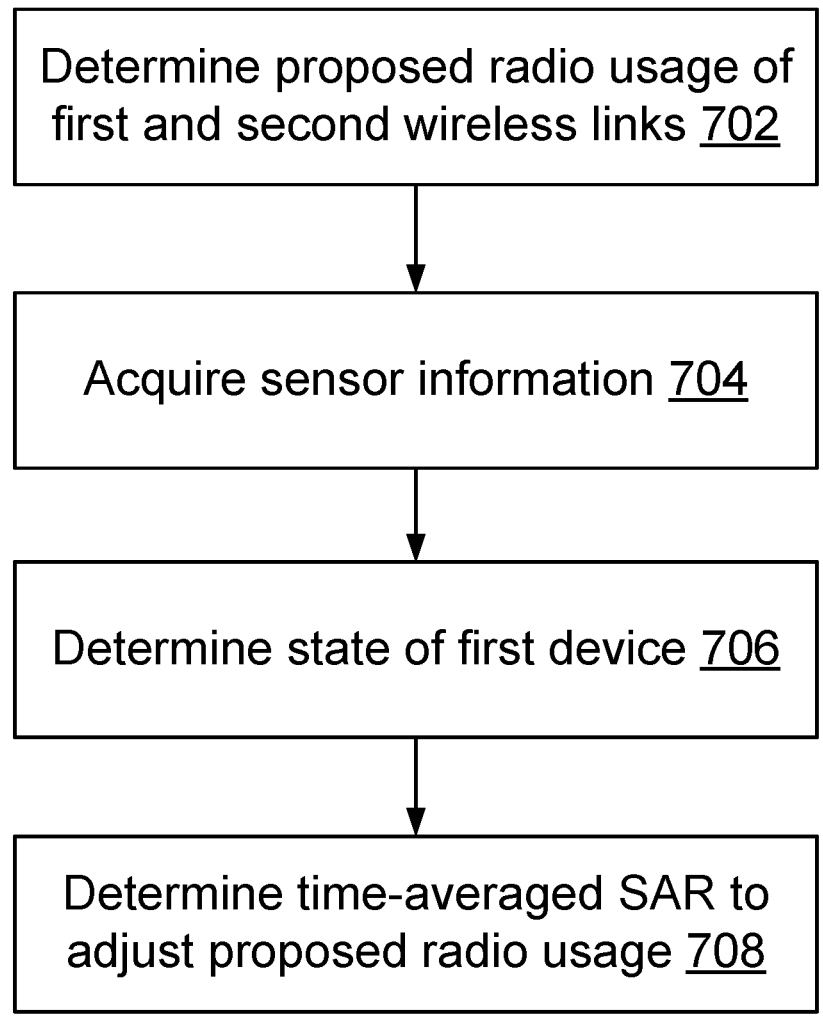
FIG. 7 is a flowchart showing a process for adjusting a radio usage of one or more wireless links based on a time-averaged SAR, according to an example implementation of the present disclosure.

FIG. 7 is a flow diagram of one embodiment of a process 700 for adapting, adjusting, modifying, and/or updating a radio usage of one or more wireless links based on a time-averaged SAR of a user due to a device, according to an example implementation of the present disclosure. The functionalities of the process 700 may be implemented using, or performed by, the components detailed herein in connection with FIGS. 1-6. In some embodiments, the process 700 can be performed by the computing device 110, such as computing device 110A and/or computing device 110B. In some embodiments, the process 700 can be performed by other entities, such as an access point 105 and/or a HWD 150. In some embodiments, the process 700 may include more, fewer, or different steps than shown in FIG. 7.

In brief overview, a first device 110, 150 may determine a proposed radio usage of a first wireless link 125 and/or a second wireless link 102 (702). The first device 110, 150 may acquire sensor information (704). The first device 110, 150 may determine a state/condition/configuration of the first device 110, 150 (706). The first device 110, 150 may determine a time-averaged SAR to adjust the proposed radio usage (708).

Referring now to operation (702), and in some embodiments, a first device 110, 150 (e.g., a first UE, a wearable device, and/or other wireless devices) may determine, calculate, and/or establish a proposed radio usage of at least one wireless link, such as a first wireless link 125 (e.g., intralink and/or other communication links) and/or a second wireless link 102 (e.g., interlink and/or other communication links). For instance, a scheduler (e.g., a radio scheduler) of the first device 110, 150 may determine the proposed radio usage according to (or based on) a quality and/or QoS of the link(s). In some embodiments, the first device 110, 150 may determine the proposed radio usage according to (or by using) a quality of at least one wireless link (e.g., a channel quality and/or other channel properties, such as channel bandwidth or signal-to-noise ratio) and/or a QoS (e.g., a bit rate and/or a packet loss rate) of at least one wireless link. For instance, a scheduler 238 of the first device 110, 150 may determine and/or allocate a proposed usage of one or more radio links (e.g., a maximum throughput per wireless link) according to a QoS (e.g., reliability, as measured by an amount of dropped packets) and/or channel quality of the link(s). In some embodiments, the first device 110, 150 may determine the proposed radio usage according to a configuration of a traffic buffer of at least one wireless link and/or a power headroom corresponding to at least one wireless link. The power headroom may indicate and/or specify an amount/margin of transmission power left/available for a first device 110, 150 to use in addition to the power being used by a current transmission. In one example, a scheduler 238 of the first device 110, 150 may determine and/or allocate a proposed radio usage (e.g., a predicted radio usage over time) of one or more wireless links according to a size and/or memory of a traffic buffer (and/or other traffic buffer configurations) of the one or more wireless links.

In some embodiments, a proposed radio usage may comprise at least one of: a data rate (e.g., data blocks per unit time passing through a wireless link), a RF emission level (e.g., SAR in W/kg), and/or a transmission power (e.g., energy used by the first device 110, 150 to transmit information) of the first device 110, 150 for at least the first wireless link 125 and/or the second wireless link 102. In certain embodiments, a proposed radio usage may comprise at least one of: a transmission schedule (e.g., transmission time and/or power level for transmitting one or more packets in a given amount of time), a ranking or selection of radio devices (e.g., a preferred usage of the radio devices), and/or use of one or more antennas of the first device 110, 150 (e.g., antenna/module/beam selection for intralink and/or interlink radios) for at least the first wireless link 125 and/or the second wireless link 102. In some embodiments, the first device 110, 150 may be configured to concurrently/simultaneously maintain and/or establish at least two wireless links (e.g., the first wireless link 125 and/or the second wireless link 102), e.g., for a period of time or intermittently. The first wireless link 125 may include or correspond to a wireless link with a second device 150A, 150B (e.g., intralink between a UE and a HWD). The second wireless link 102 may include or correspond to a wireless link with an access point 105 of a network and/or other network devices (e.g., interlink between a first device 110, 150 and the access point 105). In some embodiments, at least one sensor of the first device 110, 150 (e.g., proximity sensors and/or motion sensors) may acquire and/or obtain sensor information (704). The sensor information may include at least one of: a proximity of the first device 110, 150 to the user (e.g., the proximity of the first device 110, 150 to the head of the user), whether there is contact between the first device 110, 150 and the user (e.g., the first device 110, 150 is touching the user), and/or a motion of the first device 110A.

Referring now to operation (706), and in some embodiments, the first device 110, 150 may determine and/or identify a state (e.g., DSI and/or other indicators) of the first device 110, 150. For instance, the SAR/PD engine 234 of the first device 110, 150 may use the proposed radio usage (e.g., determined by the scheduler) and/or sensor information (e.g., from at least one sensor of the first device 110, 150) to determine the state of the first device 110, 150. In some embodiments, the first device 110, 150 (e.g., SAR/PD engine 234) may determine the state of the first device 110, 150 further according to at least one of: traffic (e.g., wireless/network traffic) information of the first wireless link 125, and/or traffic information of the second wireless link 102. For example, the first device 110, 150 may determine the state of the first device 110, 150 according to an amount of traffic and/or a type of traffic (e.g., control traffic, data traffic, and/or other types of traffic) in at least one wireless link. In some embodiments, the first device 110, 150 (e.g., SAR/PD engine 234) may determine the state of the first device 110, 150 according to a proposed subset of antennas to use. For instance, the first device 110, 150 may determine and/or identify the proposed subset of antennas according to sensor information (e.g., information from proximity/motion sensors) and/or the proposed radio usage. In one example, the sensor information from at least one proximity sensor (or other sensors) may indicate/specify that a user is in close proximity (e.g., in contact with, or within a defined distance) to a first antenna and a second antenna of the first device 110, 150 (e.g., the first and second antennas are blocked/obstructed by the user). Therefore, the first device 110, 150 may determine to use a third antenna and/or a fourth antenna (e.g., proposed subset of antennas) for transmissions, according to the sensor information. Responsive to determining the proposed subset of antennas to use (e.g., third antenna and/or a fourth antenna, according to sensor information), the first device 110, 150 may determine that an entity is blocking an antenna of the device (e.g., the state of the first device 110, 150).

Referring now to operation (708), and in some embodiments, the first device 110, 150 may determine, calculate, and/or compute a time-averaged SAR of a user due to the first device 110, 150. For instance, a user may be exposed to RF energy emitted/generated by the first device 110, 150 over/during a defined time window (e.g., 100 seconds and/or other time instances). As such, the first device 110, 150 may determine the time-averaged SAR of the user, due to the RF energy emitted by the first device 110, 150, over the defined time window (e.g., an averaged SAR over the defined time window). Responsive to determining the time-averaged SAR of the user, the first device 110, 150 may adjust and/or modify the proposed radio usage (e.g., determined by the scheduler) of at least one wireless link (e.g., to comply with RF emission standards/regulations). As such, the first device 110, 150 (e.g., SAR/PD control entity 236) may determine the time-averaged SAR to adjust the proposed radio usage of the first wireless link 125 and/or the second wireless link 102 to satisfy/meet/comply with a threshold level of the time-averaged SAR. For example, the first device 110, 150 may adjust the proposed radio usage of at least one wireless link to maintain the determined time-averaged SAR below the threshold level (e.g., and/or maintain the determined time-averaged SAR at a certain percentage of the threshold level) of the time-averaged SAR (e.g., to limit RF emissions/exposure). In some embodiments, the first device 110, 150 may determine the time-averaged SAR according to (or based on) a defined time window (e.g., predetermined by a wireless system and/or wireless specifications) and/or the determined state of the first device 110, 150 (e.g., determined by the SAR/PD engine 234). For instance, the SAR/PD engine 234 may determine that a first device 110, 150 is in close proximity to a user of the first device 110, 150 over a defined time window (e.g., 60 seconds). Given the determined state of the first device 110, 150 (e.g., in close proximity to a user) and/or the defined time window (e.g., 60 seconds), the SAR/PD control entity 236 may determine that the time-averaged SAR does not satisfy (e.g., exceeds) the threshold level of the time-averaged SAR. As such, the SAR/PD control entity 236 of the first device 110, 150 may adjust and/or modify the proposed radio usage to satisfy the threshold level of the time-averaged SAR.

In some embodiments, the first device 110, 150 may operate, control and/or manage at least one radio device of the first device 110, 150 for the first wireless link 125 according to the adjusted radio usage. For instance, a first UE (e.g., first device 110, 150) may operate a first radio interface/device (e.g., at least one radio device) for an intralink (and/or communication links) according to an adjusted radio usage (e.g. to satisfy a threshold level of a time-averaged SAR). Furthermore, the first device 110, 150 may operate at least one radio device of the first device 110, 150 for the second wireless link 102 (e.g., according to the adjusted radio usage), concurrent with the operating of the at least one radio device for the first wireless link 125. For example, concurrent with operating the first radio interface/device for the intralink, the first UE may operate or communicate with a second device for an interlink based on the modified radio usage of the interlink. As such, responsive to operating at least one radio device of the first device 110, 150 according to the adjusted radio usage (e.g., for the intralink and/or the interlink), the first device 110, 150 (and/or a system that includes the first device 110, 150) may comply with and/or satisfy a threshold level (and/or other levels/specifications) of the time-averaged SAR of the user.

Figure 8:
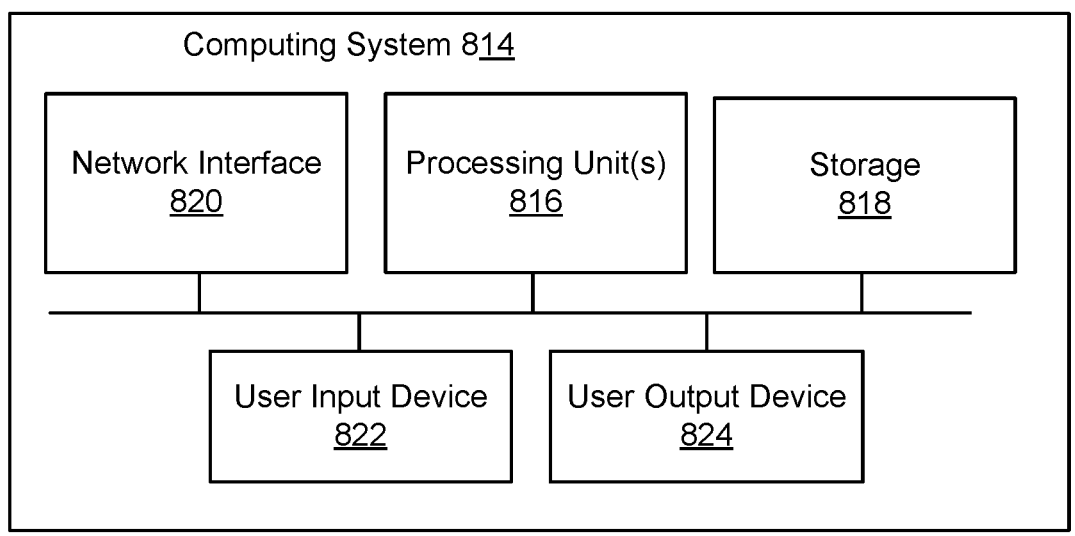
FIG. 8 is a block diagram of a computing environment, according to an example implementation of the present disclosure.

Various operations described herein can be implemented on computer systems. FIG. 8 shows a block diagram of a representative computing system 814 usable to implement the present disclosure. In some embodiments, the computing device 110, the HWD 150 or both of FIG. 1 are implemented by the computing system 814. Computing system 814 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 814 can be implemented to provide VR, AR, MR experience. In some embodiments, the computing system 814 can include conventional computer components such as processors 816, storage device 818, network interface 820, user input device 822, and user output device 824.

Network interface 820 can provide a connection to a wide area network (e.g., the Internet) to which WAN interface of a remote server system is also connected. Network interface 820 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 822 can include any device (or devices) via which a user can provide signals to computing system 814; computing system 814 can interpret the signals as indicative of particular user requests or information. User input device 822 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 824 can include any device via which computing system 814 can provide information to a user. For example, user output device 824 can include a display to display images generated by or delivered to computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 816 can provide various functionality for computing system 814, including any of the functionality described herein as being performed by a server or client, or other functionality associated with message management services.

It will be appreciated that computing system 814 is illustrative and that variations and modifications are possible. Computer systems used in connection with the present disclosure can have other capabilities not specifically described here. Further, while computing system 814 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   determining, by a first device configured to maintain a first wireless link with a second device and a second wireless link with an access point, a proposed radio usage of the first wireless link and the second wireless link;
   determining, by the first device, a state of the first device according to the proposed radio usage; and
   determining, by the first device, a time-averaged specific absorption rate (SAR) due to the first device according to the determined state of the first device, to adjust the proposed radio usage.

2. The method of claim 1, comprising:
   acquiring, by at least one sensor of the first device, sensor information, wherein the sensor information comprises at least one of: a proximity of the first device to a user, whether there is contact between the first device and the user, or a motion of the first device.

3. The method of claim 1, comprising:
   determining, by the first device, the proposed radio usage according to at least one of: a quality of the first wireless link, a quality of the second wireless link, a quality-of-service (QoS) of the first wireless link, a QoS of the second wireless link, a configuration of a traffic buffer of the first wireless link, a configuration of a traffic buffer of the second wireless link, a power headroom corresponding to the first wireless link, or a power headroom corresponding to the second wireless link.

4. The method of claim 1, wherein the proposed radio usage comprises at least one of: a data rate, a radio-frequency emission level, a transmission power, a transmission schedule, a ranking or selection of radio devices, or use of one or more antennas, of the first device for at least the first wireless link or the second wireless link.

5. The method of claim 1, comprising:
   determining, by the first device, the state of the first device further according to at least one of: traffic information of the first wireless link, or traffic information of the second wireless link.

6. The method of claim 1, comprising:
   determining, by the first device, a proposed subset of antennas to use, according to sensor information and the proposed radio usage.

7. The method of claim 6, comprising:
   determining, by the first device, the state of the first device further according to the proposed subset of antennas to use.

8. The method of claim 1, comprising:
   operating, by the first device according to the adjusted radio usage, at least one radio device of the first device for the first wireless link.

9. The method of claim 8, comprising:
   operating, by the first device according to the adjusted radio usage, at least one radio device of the first device for the second wireless link, concurrent with the operating of the at least one radio device for the first wireless link.

10. A first device configured to maintain a first wireless link with a second device and a second wireless link with an access point, the first device comprising:
    at least one processor configured to:
       determine a proposed radio usage of the first wireless link and the second wireless link;
       determine a state of the first device according to the proposed radio usage; and
       determine a time-averaged specific absorption rate (SAR) due to the first device according to the determined state of the first device, to adjust the proposed radio usage.

11. The first device of claim 10, comprising at least one sensor, the at least one sensor configured to acquire sensor information, wherein the sensor information comprises at least one of: a proximity of the first device to a user, whether there is contact between the first device and the user, or a motion of the first device.

12. The first device of claim 10, wherein the at least one processor is configured to:
    determine the proposed radio usage according to at least one of: a quality of the first wireless link, a quality of the second wireless link, a quality-of-service (QoS) of the first wireless link, a QoS of the second wireless link, a configuration of a traffic buffer of the first wireless link, a configuration of a traffic buffer of the second wireless link, a power headroom corresponding to the first wireless link, or a power headroom corresponding to the second wireless link.

13. The first device of claim 10, wherein the proposed radio usage comprises at least one of: a data rate, a radio-frequency emission level, a transmission power, a transmission schedule, a ranking or selection of radio devices, or use of one or more antennas, of the first device for at least the first wireless link or the second wireless link.

14. The first device of claim 10, wherein the at least one processor is configured to:
determine the state of the first device further according to at least one of: traffic information of the first wireless link, or traffic information of the second wireless link.

15. The first device of claim 10, wherein the at least one processor is configured to:
determine a proposed subset of antennas to use, according to sensor information and the proposed radio usage.

16. The first device of claim 15, wherein the at least one processor is configured to:
determine the state of the first device further according to the proposed subset of antennas to use.

17. The first device of claim 10, wherein the at least one processor is configured to:
operate, according to the adjusted radio usage, at least one radio device of the first device for the first wireless link.

18. The first device of claim 17, wherein the at least one processor is configured to:
operate, according to the adjusted radio usage, at least one radio device of the first device for the second wireless link, concurrent with the operating of the at least one radio device for the first wireless link.

19. A non-transitory computer readable medium storing instructions for causing at least one processor of a first device configured to maintain a first wireless link with a second device and a second wireless link with an access point, to:
determine a proposed radio usage of the first wireless link and the second wireless link;
determine a state of the first device according to the proposed radio usage; and
determine a time-averaged specific absorption rate (SAR) due to the first device according to the determined state of the first device, to adjust the proposed radio usage.

20. The non-transitory computer readable medium of claim 19, wherein the instructions cause the at least one processor to:
determine the proposed radio usage according to at least one of: a quality of the first wireless link, a quality of the second wireless link, a quality-of-service (QoS) of the first wireless link, a QoS of the second wireless link, a configuration of a traffic buffer of the first wireless link, a configuration of a traffic buffer of the second wireless link, a power headroom corresponding to the first wireless link, or a power headroom corresponding to the second wireless link.

\* \* \* \* \*